(12) United States Patent
Yang et al.

(10) Patent No.: US 11,753,512 B2
(45) Date of Patent: Sep. 12, 2023

(54) FLAME-RETARDANT POLYESTER FILM

(71) Applicant: NAN YA PLASTICS CORPORATION, Taipei (TW)

(72) Inventors: Wen-Cheng Yang, Taipei (TW); Te-Chao Liao, Taipei (TW); Chia-Yen Hsiao, Taipei (TW); Hao-Sheng Chen, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 110 days.

(21) Appl. No.: 17/199,451

(22) Filed: Mar. 12, 2021

(65) Prior Publication Data

US 2022/0017707 A1 Jan. 20, 2022

(30) Foreign Application Priority Data

Jul. 15, 2020 (TW) ................ 109123857

(51) Int. Cl.
| | | |
|---|---|---|
| *C08J 5/18* | (2006.01) | |
| *B29C 48/00* | (2019.01) | |
| *C08G 63/183* | (2006.01) | |
| *C08G 63/692* | (2006.01) | |
| *C08J 3/12* | (2006.01) | |
| *C08K 3/04* | (2006.01) | |
| *C08K 3/22* | (2006.01) | |
| *C08K 3/26* | (2006.01) | |
| *C08K 3/30* | (2006.01) | |
| *C08K 3/36* | (2006.01) | |
| *C08K 5/00* | (2006.01) | |
| *C08K 5/098* | (2006.01) | |
| *C08L 25/06* | (2006.01) | |
| *C08L 33/08* | (2006.01) | |
| *C08L 67/02* | (2006.01) | |

(52) U.S. Cl.
CPC ............... *C08J 5/18* (2013.01); *B29C 48/022* (2019.02); *C08G 63/183* (2013.01); *C08G 63/692* (2013.01); *C08J 3/12* (2013.01); *C08K 3/04* (2013.01); *C08K 3/22* (2013.01); *C08K 3/26* (2013.01); *C08K 3/30* (2013.01); *C08K 3/36* (2013.01); *C08K 5/0066* (2013.01); *C08K 5/098* (2013.01); *C08L 25/06* (2013.01); *C08L 33/08* (2013.01); *C08L 67/02* (2013.01); *C08K 2003/2203* (2013.01); *C08K 2003/2227* (2013.01); *C08K 2003/2241* (2013.01); *C08K 2003/265* (2013.01); *C08K 2003/3045* (2013.01); *C08K 2201/005* (2013.01); *C08L 2201/02* (2013.01); *C08L 2201/10* (2013.01); *C08L 2203/16* (2013.01); *C08L 2203/30* (2013.01); *C08L 2207/20* (2013.01)

(58) Field of Classification Search
CPC ....... C08L 67/02; C08K 5/0066; C08K 5/098; C08K 3/22
See application file for complete search history.

(56) References Cited

U.S. PATENT DOCUMENTS

| | | |
|---|---|---|
| 7,186,455 B2 | 3/2007 | Murschall et al. |
| 2002/0065346 A1 | 5/2002 | Murschall et al. |
| 2004/0151877 A1 | 8/2004 | Suh |
| 2014/0288209 A1 | 9/2014 | Jung et al. |

FOREIGN PATENT DOCUMENTS

| | | | |
|---|---|---|---|
| CN | 101195685 A | | 6/2008 |
| CN | 111138641 A | | 5/2020 |
| EP | 0164518 B1 | * | 5/1990 |
| JP | 2007169424 A | | 7/2007 |
| JP | 2011256328 A | | 12/2011 |
| JP | 5298414 B2 | | 9/2013 |
| JP | 2017214577 A | | 12/2017 |
| JP | 201852125 A | | 4/2018 |
| JP | 2018168381 A | | 11/2018 |
| TW | 201307434 A1 | | 2/2013 |

OTHER PUBLICATIONS

Machine translation of EP 0164518 (Year: 1990).*

* cited by examiner

*Primary Examiner* — Wenwen Cai
(74) *Attorney, Agent, or Firm* — Li & Cai Intellectual Property Office

(57) ABSTRACT

A flame-retardant polyester film and a method for manufacturing the same are provided. The flame-retardant polyester film includes a physically recycled polyester resin and a chemically recycled polyester resin. The physically recycled polyester resin is formed by a plurality of physically recycled polyester chips. The chemically recycled polyester resin is formed by a plurality of chemically recycled polyester chips and mixed with the physically recycled polyester resin. The plurality of chemically recycled polyester chips further includes chemically recycled electrostatic pinning polyester chips. The chemically recycled electrostatic pinning polyester chips contain electrostatic pinning additives, and the electrostatic pinning additives are metal salts. Expressed in percent by weight based on a total weight of the polyester film, a content of the electrostatic pinning additives in the polyester film is between 0.005% and 0.1% by weight. The flame-retardant polyester film further includes a flame-retardant additive.

8 Claims, No Drawings

FLAME-RETARDANT POLYESTER FILM

CROSS-REFERENCE TO RELATED PATENT APPLICATION

This application claims the benefit of priority to Taiwan Patent Application No. 109123857, filed on Jul. 15, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a flame-retardant polyester film and a method for manufacturing the same, and more particularly to a flame-retardant polyester film that uses both a physically recycled polyester resin and a chemically recycled polyester resin, and a method for manufacturing the same.

BACKGROUND OF THE DISCLOSURE

In recent years, usage of plastics has increased significantly, and as a result, a large amount of plastic waste is produced. Since the plastics are not easily degraded, recycling of the plastics and how to process the plastics after recycling have become particularly important issues.

Polyethylene terephthalate (PET) makes up a major portion of recycled plastics, and recycled PET plastics takes up about 52.4% of a total amount of the recycled plastics. As such, the following description will be based on the recycled PET plastics. In order to deal with such a large amount of recycled PET plastics, researchers in the relevant field have to dedicate themselves to developing a method for processing the recycled PET plastics.

Out of the current techniques, the most common method to regenerate PET is through a physical (mechanical) manner. The recycled PET plastics that have been washed clean are firstly shredded to pieces and melted under high temperature, and then are extruded by an extruder to produce recycled PET chips (also called as r-PET).

To address environmental concerns and to ensure that PET products contain more eco-friendly recycled PET chips, a large amount of high-quality recycled PET chips is required. In the current industry, the PET recycling is mostly carried out by way of physical recycling. However, functional components (such as a slipping agent and an electrostatic pinning agent) are not allowed to be added, during a manufacturing process, to recycled chips that are produced through physical recycling. Therefore, it is necessary to use additional virgin (not regenerated) PET chips for additionally adding the above-mentioned functional components.

In this way, however, a usage rate of the recycled PET chips contained in the PET products will decrease. That is to say, in the current techniques, it is not possible to fully utilize the recycled PET chips to manufacture new PET products. If the usage rate of the recycled PET chips is too low, it may not be possible to satisfy a standard set up by environmental regulations such that an eco-label can be obtained. Moreover, as virgin PET chips that are newly used in the process of manufacturing the PET products would subsequently become the recycled PET plastics that require processing, a problem of recycling and reusing would still arise.

SUMMARY OF THE DISCLOSURE

In response to the above-referenced technical inadequacies, the present disclosure provides a flame-retardant polyester film and a method for manufacturing the same.

In one aspect, the present disclosure provides a method for manufacturing a flame-retardant polyester film, which is used to recycle and reuse a recycled polyester material. The method for manufacturing the flame-retardant polyester film includes: physically reproducing a part of the recycled polyester material and granulating the same to obtain a plurality of physically recycled polyester chips; chemically reproducing another part of the recycled polyester material and granulating the same to obtain a plurality of chemically recycled polyester chips; and mixing the plurality of physically recycled polyester chips and the plurality of chemically recycled polyester chips, and melt extruding the same to form a polyester film. The plurality of chemically recycled polyester chips further includes chemically recycled electrostatic pinning polyester chips. The chemically recycled electrostatic pinning polyester chips contain at least one kind of electrostatic pinning additives, and the electrostatic pinning additives are metal salts. Based on 100 parts by weight of a total content of the polyester chips, a content of the chemically recycled electrostatic pinning polyester chips of the plurality of chemically recycled polyester chips is between 5 and 35 parts by weight. The method for manufacturing the flame-retardant polyester film further includes: in at least one of the physical reproducing step and the chemical reproducing step, adding a flame-retardant additive to the recycled polyester material, so that the polyester film that is finally formed includes the flame-retardant additive.

Preferably, the flame-retardant additive is a phosphorus flame retardant. A content of a phosphorus (P) element of the phosphorus flame retardant in the flame-retardant polyester film is between 10 ppm and 20,000 ppm, and the flame-retardant polyester film satisfies a flame-retardant standard of UL94 VTM-2 and above.

Preferably, in the polyester film, the plurality of physically recycled polyester chips form a physically recycled polyester resin, and the plurality of chemically recycled polyester chips form a chemically recycled polyester resin that is mixed with the physically recycled polyester resin. Based on 100 parts by weight of the total content of the polyester chips, a content of the plurality of physically recycled polyester chips is between 50 and 95 parts by weight, a content of the plurality of chemically recycled polyester chips is between 1 and 40 parts by weight, and a total content of the plurality of physically recycled polyester chips and the plurality of chemically recycled polyester chips is between 55 and 100 parts by weight.

Preferably, the step of chemically reproducing another part of the recycled polyester material further includes: depolymerizing the recycled polyester material to obtain a raw material mixture, and repolymerizing the raw material mixture and granulating the same, thereby obtaining the plurality of chemically recycled polyester chips.

Preferably, the step of repolymerizing the raw material mixture further includes: adding the electrostatic pinning additives to a part of the raw material mixture, and then repolymerizing the raw material mixture that is added with the electrostatic pinning additives and granulating the same, thereby obtaining the chemically recycled electrostatic pinning polyester chips.

Preferably, a content of the electrostatic pinning additives in the chemically recycled electrostatic pinning polyester chips is between 0.01% and 0.3% by weight, so that a content of the electrostatic pinning additives in the polyester film is between 0.005% and 0.1% by weight.

Preferably, the step of repolymerizing the raw material mixture further includes: adding a slipping agent to a part of the raw material mixture, and then repolymerizing the raw material mixture that is added with the slipping agent and granulating the same to obtain chemically recycled slipping polyester chips. The slipping agent is at least one selected from a material group consisting of silicon dioxide particles, calcium carbonate particles, barium sulfate particles, polystyrene particles, silica gel particles, and acrylic particles. Based on 100 parts by weight of the total content of the polyester chips, a content of the chemically recycled slipping polyester chips is between 5 and 10 parts by weight.

Preferably, a particle size of the slipping agent is less than 2 micrometers. A content of the slipping agent in the chemically recycled slipping polyester chips is between 0.1% and 20% by weight, so that a content of the slipping agent in the polyester film is between 0.01% and 2% by weight, and the polyester film has a transparency of not less than 85%.

Preferably, the step of repolymerizing the raw material mixture further includes: adding the flame-retardant additive to a part of the raw material mixture, and then repolymerizing the raw material mixture that is added with the flame-retardant additive and granulating the same to obtain chemically recycled flame-retardant polyester chips.

Preferably, the flame-retardant additive is a reactive phosphorus flame retardant, and the reactive phosphorus flame retardant is an organic phosphorus flame retardant that has a chemical structure including both a hydroxyl group (—OH) and a carboxyl group (—COOH).

Preferably, when the reactive phosphorus flame retardant is provided in the chemical reproducing step, a copolymerization reaction is carried out between the raw material mixture and the hydroxyl group and the carboxyl group in the chemical structure of the reactive phosphorus flame retardant. The reactive phosphorus flame retardant is grafted onto at least one of a main chain and a branched chain of a polyester molecular structure in the process of repolymerizing the raw material mixture.

Preferably, the step of physically reproducing a part of the recycled polyester material further includes: physico-mechanically shredding the recycled polyester material, and then adding the flame-retardant additive to the shredded recycled polyester material and granulating the same to obtain physically recycled flame-retardant polyester chips.

Preferably, the plurality of physically recycled polyester chips and the plurality of chemically recycled polyester chips are both obtained through recycling, reusing, and granulation of the recycled polyester material. The recycled polyester material is recycled PET (r-PET) bottle chips.

Preferably, a polyester component of the recycled PET bottle chips includes isophthalic acid (IPA) serving as a dibasic acid unit, so that the polyester film that is finally formed also contains the isophthalic acid. Expressed in mole percent based on a total weight of the polyester film, a content of the isophthalic acid in the polyester film is between 0.5 mol % and 5 mol %.

Preferably, a polyester component of the recycled PET bottle chips includes biomass-derived ethylene glycol serving as a diol unit, so that the polyester film that is finally formed also contains the biomass-derived ethylene glycol. Expressed in percent by weight based on the total weight of the polyester film, a content of the biomass-derived ethylene glycol in the polyester film is between 1% and 25% by weight. A content of carbon derived from the biomass as measured by carbon dating (C14) is not greater than 5% based on a total carbon content of the polyester film.

In another aspect, the present disclosure provides a flame-retardant polyester film. The flame-retardant polyester film includes a physically recycled polyester resin formed by a plurality of physically recycled polyester chips, and a chemically recycled polyester resin formed by a plurality of chemically recycled polyester chips and mixed with the physically recycled polyester resin. The plurality of chemically recycled polyester chips further includes chemically recycled electrostatic pinning polyester chips. The chemically recycled electrostatic pinning polyester chips contain at least one kind of electrostatic pinning additives, and the electrostatic pinning additives are metal salts. Expressed in percent by weight based on a total weight of the polyester film, a content of the electrostatic pinning additives in the polyester film is between 0.005% and 0.1% by weight. The polyester film further includes a flame-retardant additive, and the flame-retardant additive is dispersed in at least one of the physically recycled polyester resin and the chemically recycled polyester resin.

Preferably, the flame-retardant additive is a phosphorus flame retardant, a content of a phosphorus (P) element of the phosphorus flame retardant in the flame-retardant polyester film is between 10 ppm and 20,000 ppm, and the flame-retardant polyester film satisfies a flame-retardant standard of UL94 VTM-2 and above.

Preferably, expressed in percent by weight based on the total weight of the polyester film, a content of the physically recycled polyester resin is between 50% and 95% by weight, a content of the chemically recycled polyester resin is between 1% and 40% by weight, and a total content of the physically recycled polyester resin and the chemically recycled polyester resin is between 55% and 100% by weight.

Preferably, the plurality of chemically recycled polyester chips further includes chemically recycled slipping polyester chips. The chemically recycled slipping polyester chips contain a slipping agent, and the slipping agent is at least one selected from a material group consisting of silicon dioxide particles, calcium carbonate particles, barium sulfate particles, polystyrene particles, silica gel particles, and acrylic particles. Based on 100 parts by weight of a total content of the polyester chips, a content of the chemically recycled slipping polyester chips is between 5 and 10 parts by weight relative to the total content of the polyester chips.

Preferably, a particle size of the slipping agent is less than 2 micrometers. Expressed in percent by weight based on the total weight of the polyester film, a content of the slipping agent in the polyester film is between 0.01% and 2% by weight, so that the polyester film has a transparency of not less than 85%.

Preferably, the flame-retardant polyester film further includes a slipping agent. The slipping agent is selected from a group consisting of silicon dioxide, polystyrene, poly (methyl methacrylate), silica gel, and acrylic. Expressed in percent by weight based on the total weight of the polyester film, an added amount of the slipping agent is between 5% and 10% by weight.

Preferably, the flame-retardant polyester film further includes a matte additive. The matte additive is selected from a group consisting of silicon dioxide particles, calcium carbonate particles, aluminum oxide particles, and talc powder. Expressed in percent by weight based on the total weight of the polyester film, an added amount of the matte additive is between 0.5% and 10% by weight.

Preferably, the flame-retardant polyester film further includes a white additive. The white additive is selected from a group consisting of titanium dioxide, barium sulfate, and calcium carbonate. Expressed in percent by weight based on the total weight of the polyester film, an added amount of the white additive is between 5% and 40% by weight.

Preferably, the flame-retardant polyester film further includes a black additive. The black additive is selected from a group consisting of carbon black and black coloring materials. Expressed in percent by weight based on the total weight of the polyester film, an added amount of the black additive is between 5% and 40% by weight.

One beneficial effect of the present disclosure is that, in the flame-retardant polyester film and the method for manufacturing the same as provided, by virtue of "the plurality of chemically recycled polyester chips further including chemically recycled electrostatic pinning polyester chips, the chemically recycled electrostatic pinning polyester chips containing the electrostatic pinning additives, and the electrostatic pinning additives being metal salts" and "based on 100 parts by weight of the total content of the polyester chips, the content of the chemically recycled electrostatic pinning polyester chips of the plurality of chemically recycled polyester chips being between 5 and 35 parts by weight", the flame-retardant polyester film can be manufactured by using a highly recycled polyester material, without needing to add additional virgin polyester chips or only needing to add a small amount thereof. In this way, a usage amount of the virgin polyester chips can be decreased significantly, and environmental concerns can be addressed.

Furthermore, in the flame-retardant polyester film and the method for manufacturing the same as provided by the present disclosure, through "adding the flame-retardant additive to the recycled polyester material in at least one of the physical reproducing step and the chemical reproducing step", the flame-retardant polyester film has a certain flame-retardant effect, and can be applied to specific products (e.g., architectural materials, electronic products, light-shading tapes for mobile phone, and laptop keyboard skins).

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

There are no drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

In order to process large amounts of recycled plastics, especially with respect to a recycled polyester material, an embodiment of the present disclosure provides a flame-retardant polyester film that is produced by using the recycled polyester material, and a method for manufacturing the same.

In the polyester film of the present embodiment and the method for manufacturing the same, a physically recycled polyester resin is obtained through physical reproduction, and a chemically recycled polyester resin is obtained through chemical reproduction. In this way, a usage amount of the recycled polyester material in the polyester film would increase.

To be more specific, the polyester film of the present embodiment can be produced by using a highly recycled polyester material, without needing to add additional virgin polyester chips or only needing to add a small amount thereof

[Recycled Polyester Material]

Firstly, to obtain the recycled polyester material that is reusable, a recycling method for polyester resins includes: collecting discarded polyester resin materials of all types. The discarded polyester resin materials are then sorted by type, color, and intended purpose. Further, these discarded polyester resin materials are pressed and baled to be shipped to waste treatment facilities. In the present embodiment, the discarded polyester resin materials are recycled PET bottles. However, the present disclosure is not limited thereto.

Next, other parts (e.g., bottle tops, labels, and adhesives) of the discarded polyester resin materials would be removed. When such parts are removed from the discarded polyester resin materials, the discarded polyester resin materials are shredded, and then bottle rims, gaskets, and bottle bodies of different materials are separated from each other by flotation. The discarded polyester resin materials that are shredded are then dried. In this way, the recycled polyester material which has been processed, e.g., recycled PET (r-PET) bottle chips, can be obtained, and a subsequent process for manufacturing the polyester film may proceed.

It is worth mentioning that, in other embodiments of the present disclosure, the recycled polyester material can be, for example, a processed recycled polyester material directly obtained through purchase, so as to proceed with the subsequent process for manufacturing the polyester film.

In the embodiment of the present disclosure, the method for manufacturing the polyester film includes: physically reproducing a part of the recycled polyester material (e.g., PET bottle chips) and granulating the same to obtain a plurality of physically recycled polyester chips, and chemically reproducing another part of the recycled polyester material and granulating the same to obtain a plurality of chemically recycled polyester chips.

It should be noted that, the terms "polyester", "polyester material", "polyester resin", etc. refer to any type of polyester, and especially to polyarylate. In particular, polyester derived from terephthalic acid and ethylene glycol, i.e., polyethylene terephthalate (PET), is referred to herein.

The polyester can also be, for example, poly trimethylene terephthalate, polybutylene terephthalate, or polyethylene naphthalate. The polyester in the present embodiment is preferably polyethylene terephthalate and poly trimethylene terephthalate. Moreover, a copolymer can also be used. The copolymer herein particularly refers to a copolymer derived from more than two types of dicarboxylic acid and/or more than two types of diol component.

[Physical Reproduction]

A physical reproduction method includes: shredding the polyester material that is recycled (e.g., PET bottle chips), so as to decrease the time and energy consumption required for melting the recycled polyester material. Next, the recycled polyester material that has been shredded is melted and mixed, and then granulated via a single-screw extruder or a twin-screw extruder, so as to obtain the plurality of physically recycled polyester chips. That is to say, after undergoing the steps of shredding, melting and extruding in a sequential order, the recycled polyester material is reshaped, so that polyester molecules in the recycled polyester material are rearranged to thereby produce the plurality of physically recycled polyester chips.

Specifically, in the present embodiment, the plurality of physically recycled polyester chips can be further separated into physically recycled regular polyester chips and physically recycled slipping polyester chips.

The physically recycled regular polyester chips are physically recycled polyester chips that are not added with other additional additives (e.g., an electrostatic pinning additive, a slipping agent, and a coloring material) in the physical reproduction process.

Further, the physically recycled slipping polyester chips are physically recycled polyester chips that are further added with a slipping agent in the physical reproduction process (especially in the polyester melting process).

That is to say, the physically recycled slipping polyester chips contain a slipping agent, and the slipping agent is at least one selected from a material group consisting of silicon dioxide particles, calcium carbonate particles, barium sulfate particles, polystyrene particles, silica gel particles, and acrylic particles.

It should be noted that, in the present embodiment, the slipping agent can not only be added to the physically recycled polyester chips, but also be selectively added to chemically recycled polyester chips.

It is also worth mentioning that the polyester molecules have only been rearranged in the physical reproduction process, without being regrouped.

Therefore, components originally present in the recycled polyester material (e.g., a metal catalyst, a slipping agent, an antioxidant, or an additive used in polyester synthesis) would still remain in a physically recycled polyester material, so that the polyester film that is finally formed would also contain such components. Meanwhile, properties that are inherent in polyester resins of PET bottles, such as having a lower concentration of cyclic oligomer, would also be kept in the physically recycled polyester chips.

[Chemical Reproduction]

A chemical reproduction method includes: shredding the polyester material that is recycled (e.g., PET bottle chips), so as to decrease the time and energy consumption required for depolymerizing the recycled polyester material. Then, by immersion of the recycled polyester material that has been shredded in a chemical depolymerization solution, the polyester molecules of the recycled polyester material are subject to scission, thereby achieving depolymerization of the recycled polyester material. Further, a polyester composite with a shorter molecular chain and an ester monomer (e.g., BHET) formed by a combination of one dibasic acid unit and two diol units can be obtained.

In the present embodiment, the chemical depolymerization solution can be a solution of, for example, water, methyl alcohol, ethanol, ethylene glycol, diethylene glycol, or a combination thereof. However, the present disclosure is not limited thereto. For example, water is used for hydrolysis, and methyl alcohol, ethanol, ethylene glycol, or diethylene glycol is used for alcoholysis.

A raw material mixture is then filtered, so as to decrease concentration of non-polyester impurities in the raw material mixture. In addition, under specific reaction conditions, monomers and/or oligomers in the raw material mixture are repolymerized and granulated, so that the plurality of chemically recycled polyester chips can be obtained.

That is to say, different from physical reproduction, the chemical reproduction process involves "depolymerizing and repolymerizing the polyester molecules of the recycled polyester material", which allows the polyester molecules to be depolymerized into molecules of smaller molecular weight, and be repolymerized to form a new polyester resin.

In other embodiments of the present disclosure, a preparation method for the chemically recycled polyester chips is not limited by the description of the above-mentioned embodiment. The chemically recycled polyester chips can also be produced by a hydrolysis method or a supercritical fluid method. In the hydrolysis method, the recycled polyester material is processed in an alkaline solution. When being subject to a certain temperature, a certain pressure, and irradiation of microwave radiation, the polyester molecules are completely split into monomers. In the supercritical fluid method, the recycled polyester material is broken down into a small amount of monomers and oligomers in the methyl alcohol that is in a supercritical fluid state. A yield of the monomers and the oligomers would be affected by a reaction temperature and a reaction time.

More specifically, in the present embodiment, the plurality of chemically recycled polyester chips can be further separated into chemical regular polyester chips, chemical slipping polyester chips, and chemical electrostatic pinning polyester chips.

The chemical regular polyester chips are chemically recycled polyester chips that are not added with other additional additives (e.g., an electrostatic pinning additive, a slipping agent, and a coloring material) in the chemical reproduction process.

Moreover, a preparation method for the above-mentioned chemical slipping polyester chips and the chemical electrostatic pinning polyester chips can be, for example, adding other additives (e.g., a slipping agent, an electrostatic pinning additive, and the like) to the raw material mixture with monomers (e.g., an ester monomer (BHET) formed by a reaction between two diol units and one dibasic acid unit) and/or oligomers in the repolymerization process of the polyester molecules. In this way, the additives would be uniformly mixed in the raw material mixture, to thereby alter properties of the chemically recycled polyester resin (e.g., slipperiness and electrostatic pinning property).

In the present embodiment, the step of repolymerizing the raw material mixture further includes: adding a slipping agent to a part of the raw material mixture to be uniformly mixed, and then repolymerizing the raw material mixture that is added with the slipping agent and granulating the same to obtain chemically recycled slipping polyester chips. The slipping agent is at least one selected from a material group consisting of silicon dioxide particles, calcium carbonate particles, barium sulfate particles, polystyrene particles, silica gel particles, and acrylic particles.

In addition, as mentioned above, the slipping agent can be selectively added in the physically recycled polyester chips and/or the chemically recycled polyester chips.

In the present embodiment, the step of repolymerizing the raw material mixture further includes: adding electrostatic pinning additives to a part of the raw material mixture, and then repolymerizing the raw material mixture that is added with the electrostatic pinning additives and granulating the same to obtain chemically recycled electrostatic pinning polyester chips.

It should be noted that, in the present description, the term "electrostatic pinning" refers to use of a material that increases electrical conductivity or decreases electrical resistance, and the term "electrostatic pinning additive" refers to the material that increases electrical conductivity or decreases electrical resistance.

According to the embodiment of the present disclosure, a preferred compound that is provided with an electrostatic pinning effect will be illustrated in the following description. However, the present disclosure is not limited thereto. Other known materials in the current technology, i.e., compounds or components that increase electrical conductivity of polyester or decrease electrical resistance thereof, can also be selected for use.

More specifically, the electrostatic pinning additives used in the present embodiment are metal salts. Preferably, the metal salts are metal salts that contain alkali metals or alkaline-earth metals, and contain aliphatic carboxylic acid.

In the metal salts that contain aliphatic carboxylic acid, a molecular structure of the aliphatic carboxylic acid contains 2 to 30 carbon atoms. For example, the aliphatic carboxylic acid (in the form of metal salts) contains monocarboxylic acid and dicarboxylic acid, and can be, for example, acetic acid, palmitic acid, stearic acid, oleic acid, or sebacic acid. In the present embodiment, the aliphatic carboxylic acid is preferably acetic acid.

Furthermore, metal components of the metal salts can be, for example, alkali metals or alkaline-earth metals. In other words, the metal salts can be, for example, lithium salts, sodium salts, potassium salts, calcium salts, or magnesium salts.

In the present embodiment, the metal salts are preferably the magnesium salts or the lithium salts. The magnesium salts can be, for example, magnesium acetate (Mg$(CH_3COO)_2$), and the lithium salts can be, for example, lithium acetate ($CH_3COOLi$). However, the present disclosure is not limited thereto.

It is worth mentioning that, in current methods for manufacturing polyester films, a method that involves electrostatic pinning of a polyester melt is often employed to improve a production speed of the polyester film. In such a method, the polyester melt is required to have as low an electrical resistance value as possible to thereby achieve a high product quality. This can often be realized through adding the electrostatic pinning additives to the polyester melt.

In the current technology, however, the electrostatic pinning additives are often added in the virgin polyester chips. Therefore, although the recycled polyester material is used for manufacturing the polyester film, a large amount of the virgin polyester chips is still required to complete the manufacturing of the polyester film. As such, a usage rate of the recycled polyester material cannot be effectively enhanced.

Compared with the current technology, the method for manufacturing the polyester film of the present embodiment is to, in the repolymerization process of the polyester molecules, add the electrostatic pinning additives to the raw material mixture with monomers (e.g., BHET) and/or oligomers. In this way, the electrostatic pinning additives and the monomers and/or the oligomers are mixed uniformly. Then, the monomers and/or the oligomers in the raw material mixture would be repolymerized, so that the electrostatic pinning additives can be more uniformly mixed in the polyester resins.

Accordingly, by providing the chemically recycled electrostatic pinning polyester chips of the present embodiment, the adding of the electrostatic pinning additives to the virgin polyester chips can be replaced, so as to effectively decrease a usage amount of the virgin polyester chips and significantly increase the usage rate of the recycled polyester material.

It should be noted that, in order for the electrostatic pinning additives of the present embodiment to be uniformly mixed in polyester components, the chemical reproduction method must be employed.

In contrast, in the physical reproduction method, since the polyester molecules cannot be significantly degraded into monomers and/or oligomers, the electrostatic pinning additives cannot be uniformly mixed in the polyester resins. Thus, an intended effect of the electrostatic pinning additives (e.g., electrostatic pinning property) is prevented from being exerted.

That is to say, through adding the chemically recycled electrostatic pinning polyester chips of the present embodiment, electrical conductivity of the polyester resins can be effectively enhanced, which allows a polyester film to be manufactured with an electrostatic wire.

In a preparation process for the polyester film, when the chemically recycled electrostatic pinning polyester chips of the present embodiment are used, the speed of a first roller (injection molding roller/cooling roller) of a polyester film production equipment is significantly increased (for example, reaching a maximum value of 120 m/min), while the polyester film can still be produced smoothly. At this speed, the polyester film can still remain closely adhered to a roller surface. In addition, at such a high speed, a thinner thin film can be produced. For example, a thin film that has a minimum thickness of 9 micrometers can be produced. In particular, the chemically recycled electrostatic pinning polyester chips of the present embodiment can effectively regulate the required electrical conductivity or electrical resistance value.

Accordingly, a number of chemically recycled polyester chips with different properties can be produced by virtue of the above-mentioned additives. Further, by virtue of the above-mentioned two different processes of physical reproduction and chemical reproduction, physically recycled polyester chips and chemically recycled polyester chips of different properties can be obtained. In this way, when a specific type of the chemically recycled polyester chips is selected, and a usage ratio is configured between the physically recycled polyester chips and the chemically recycled polyester chips, it can be advantageous for subsequent manufacturing of different polyester products (for example, a polyester film).

It is worth mentioning that, with respect to the method for manufacturing the polyester film of the present embodiment, cyclic oligomers may be generated in both the physical reproduction and chemical reproduction processes. Here, a concentration of the cyclic oligomers generated in the physical reproduction process is far less than a concentration of the cyclic oligomers generated in the chemical reproduction process.

It is also worth mentioning that, in one embodiment of the present disclosure, the step of chemically reproducing another part of the recycled polyester material further includes: using an ethylene glycol depolymerization solution to depolymerize the recycled polyester material, thereby obtaining the raw material mixture. Then, the plurality of physically recycled polyester chips are mixed with the plurality of chemically recycled polyester chips to decrease a concentration of diethylene glycol in the polyester film product. To be more specific, since a large amount of the ethylene glycol depolymerization solution is added to depolymerize the recycled polyester material, a composition ratio of diethylene glycol of the chemically recycled polyester resin as produced in a subsequent polymerization process would be relatively high. In addition, the diethylene glycol contains an ether group, which would decrease a heat resistance of the polyester material. Therefore, through mixing the plurality of physically recycled polyester chips with the plurality of chemically recycled polyester chips, an overall concentration of diethylene glycol in the polyester film is decreased in the present disclosure, thereby improving the above-mentioned problem of decreased heat resistance.

[Preparation of Polyester Film]

After the physical reproducing and chemical reproducing steps, the method for manufacturing the polyester film of the present embodiment further includes: mixing the plurality of physically recycled polyester chips and the plurality of chemically recycled polyester chips with each other, and melt extruding the same to form a polyester film.

In the polyester film, the plurality of physically recycled polyester chips forms a physically recycled polyester resin, and the plurality of chemically recycled polyester chips forms a chemically recycled polyester resin. The physically recycled polyester resin and the chemically recycled polyester resin are uniformly mixed with each other.

To enhance the usage rate of the recycled polyester material, each type of the recycled polyester chips as mentioned above has an appropriate content range.

More specifically, based on 100 parts by weight of a total content of the polyester chips, a content of the plurality of physically recycled polyester chips is preferably between 50 and 95 parts by weight, and is most preferably between 60 and 80 parts by weight. A content of the plurality of chemically recycled polyester chips is preferably between 1 and 40 parts by weight, and is most preferably between 20 and 30 parts by weight. Furthermore, a total content of the plurality of physically recycled polyester chips and the plurality of chemically recycled polyester chips is preferably between 55 and 100 parts by weight, and is most preferably between 70 and 100 parts by weight.

That is to say, expressed in percent by weight based on a total weight of the polyester film, a content of the physically recycled polyester resin is preferably between 50% and 95% by weight, and is most preferably between 60% and 80% by weight. A content of the chemically recycled polyester resin is preferably between 1% and 40% by weight, and is most preferably between 20% and 30% by weight. Furthermore, a total content of the physically recycled polyester resin and the chemically recycled polyester resin is preferably between 55% and 100% by weight, and is most preferably between 70% and 100% by weight.

It should be noted that, the term "percent by weight" may be abbreviated as "wt %" in the present description.

Based on the above configuration, a highly recycled polyester material can be used in the method for manufacturing the polyester film of the present embodiment, without needing to add additional virgin polyester chips or only needing to add a small amount thereof. For example, in one embodiment of the present disclosure, a content of the virgin polyester chips is generally not greater than 50 parts by weight, is preferably not greater than 30 parts by weight, and is most preferably not greater than 10 parts by weight.

To be specific, with respect to the slipping agent, based on 100 parts by weight of the total content of the polyester chips, a content of the physically recycled slipping polyester chips and/or the chemically recycled slipping polyester chips is between 5 and 10 parts by weight relative to the total content of the polyester chips.

Further, a particle size of the slipping agent is less than 2 micrometers. Of the physically recycled slipping polyester chips and/or the chemically recycled slipping polyester chips, a content of the slipping agent in the above-mentioned recycled slipping polyester chips is between 0.1% and 20% by weight, so that a content of the slipping agent in the polyester film is between 0.01% and 2% by weight.

In addition, with respect to the electrostatic pinning additives, based on 100 parts by weight of the total content of the polyester chips, a content of the chemically recycled electrostatic pinning polyester chips of the plurality of chemically recycled polyester chips is between 5 and 35 parts by weight.

A content of the electrostatic pinning additives in the chemically recycled electrostatic pinning polyester chips is between 0.01% and 0.3% by weight, so that a content of the electrostatic pinning additives in the polyester film is between 0.005% and 0.1% by weight.

It is worth mentioning that, in order for the polyester film to exhibit a flame-retardant effect, the method for manufacturing the flame-retardant polyester film in the present embodiment further includes: in at least one of the physical reproducing step and the chemical reproducing step, adding a flame-retardant additive to the recycled polyester material, so that the polyester film that is finally formed includes the flame-retardant additive.

For example, the flame-retardant additive can be added by way of chemical reproduction. In addition, the step of repolymerizing the raw material mixture further includes: adding the flame-retardant additive to a part of the raw mixture material, and then repolymerizing the raw material mixture that is added with the flame-retardant additive and granulating the same, to thereby obtain chemically recycled flame-retardant polyester chips.

Moreover, the flame-retardant additive can also be added by way of physical reproduction. More specifically, the step of physically reproducing a part of the recycled polyester material further includes: mechanically shredding the recycled polyester material, and then adding the flame-retardant additive to the shredded recycled polyester material and granulating the same via the single-screw extruder or the twin-screw extruder, to thereby obtain physically recycled flame-retardant polyester chips.

Accordingly, the polyester film that is finally formed further includes the flame-retardant additive, and the flame-retardant additive is evenly dispersed in at least one of the physically recycled polyester resin and the chemically recycled polyester resin.

In the present embodiment, the flame-retardant additive is preferably a phosphorus flame retardant, and the phosphorus flame retardant is a compound that contains phosphorus (P).

A flame-retardant mechanism of the phosphorus flame retardant is described as follows. (1) The phosphorus flame retardant, after being degraded by heat, releases free radicals, such as P, PO, PO2, and HPO2. Here, PO is a main substance of the compound that contains phosphorus. In a combustion process of polymers, living free radicals (e.g., H, HO, O) produced in a combustion chain action are cut off, thereby controlling the combustion and terminating the combustion reaction. (2) The phosphorus flame retardant, after being degraded by heat, releases phosphoric acid formed after dehydration. The phosphoric acid forms into metaphosphoric acid and pyrophosphoric acid after further dehydration, which are repolymerized to form strong acids, such as polyphosphoric acid and poly-metaphosphoric acid. In this way, a flame-retardant substrate (e.g., a polyester film) is catalyzed to dehydrate and be carbonized. (3) The phosphorus flame retardant continues to degrade and forms a liquid film of phosphoric acid on a surface of the substrate, which insulates the air, hinders release of combustible gases, and lessens heat transfer and a feedback intensity of heat energy from the fire to the substrate.

To be more specific, in terms of structural type, the phosphorus flame retardant can be separated into an organic phosphorus flame retardant and an inorganic phosphorus flame retardant.

Preferably, the phosphorus flame retardant in the present embodiment is an organic phosphorus flame retardant. The organic phosphorus flame retardant can be, for example, phosphate ester, phosphite, organic phosphorus salt, phosphorus heterocyclic compound, and polymer acid ester.

In addition, the phosphorus flame retardant can be separated into a reactive flame retardant and an added flame retardant according to its relation with the flame-retardant substrate (e.g., a polyester film). The reactive flame retardant is mainly to be added in the recycled polyester material in the chemical reproducing step, and the added flame retardant can be added in the recycled polyester material in the physical reproducing step and/or the chemical reproducing step.

The reactive flame retardant is an organic phosphorus flame retardant that has a chemical structure including both a hydroxyl group (—OH) and a carboxyl group (—COOH). For example, the reactive flame retardant can be hydroxyl-phenyl-phosphonium-acetate, hydroxyl-phenyl-phosphonium-propionate, or hydroxyl-phenyl-phosphonium-butyric acid. Compounds of the above-mentioned reactive flame retardant are as illustrated below, but the present disclosure is not limited thereto. Any organic phosphorus flame retardant that has a chemical structure including both a hydroxyl group (—OH) and a carboxyl group (—COOH) and can perform a copolymerization reaction would be within the scope of the reactive flame retardant of the present disclosure.

TABLE 1

Reactive Flame Retardant

| No. | Compound name | Chemical structural formula |
|---|---|---|
| 1-1 | hydroxyl-phenyl-phosphonium-acetate | HO—P(=O)(C6H5)—CH2COOH |
| 1-2 | hydroxyl-phenyl-phosphonium-propionate | HO—P(=O)(C6H5)—CH2CH2COOH |
| 1-3 | hydroxyl-phenyl-phosphonium-butyric acid | HO—P(=O)(C6H5)—CH2CH2CH2COOH |

TABLE 1-continued

Reactive Flame Retardant

| No. | Compound name | Chemical structural formula |
|---|---|---|
| 1-4 | 2-[(6-oxobenzo[c][2,1]benzoxaphosphinin-6-yl)methyl]butanedioic acid | |
| 1-5 | Bis(4-carboxyphenyl)phenylphosphine oxide | |
| 1-6 | oxaphospholane glycol ester | |
| 1-7 | Butanedioicacid,(6H-dibenz[c,e][1,2]oxaphosphorinyl-6-methyl)-,bis(2-hydroxyethyl)ester] | |
| 1-8 | 2-(9,10-dihydro-9-oxa-10-phosphaphenanthrene-10-oxide)-1,4-bis(2-hydroxyethoxy)phenylene | |
| 1-9 | | bisdiglycol spirocyclic pentaerythritol bisphosphate |

In the method of manufacturing the polyester film of the present embodiment, the reactive flame retardant is added to the raw material mixture that has monomers (e.g., BHET) and/or oligomers in the repolymerization process of the polyester molecules. In this way, the reactive flame retardant can be uniformly mixed with the monomers and/or the oligomers, and proceed with a copolymerization reaction. Then, the monomers and/or the oligomers in the raw material mixture are repolymerized, so that the reactive flame retardant can be more uniformly mixed in the polyester resins, and the polyester resins can be modified.

That is to say, in the chemical reproducing step, through the copolymerization reaction between the raw material mixture and the hydroxyl group and the carboxyl group in the chemical structure of the reactive flame retardant, the reactive flame retardant is grafted onto at least one of a main chain and a branched chain of a polyester molecular structure (e.g., polyethylene terephthalate (PET)) in the process of repolymerizing the raw material mixture.

In this way, the polyester film that is finally formed would have a better flame-retardant effect. For example, in terms of flame-retardant level, the polyester film can satisfy a flame-retardant standard of UL94 VTM-2, or even a flame-retardant standard of UL94 VTM-0.

It is worth mentioning that an effect of the reactive flame retardant being grafted onto the main chain of the polyester molecular structure is that, when residues of a burnt polyester film drop down on cotton, the cotton would not burn easily. However, the polyester film is easily dissolved by water and degraded by heat.

An effect of the reactive flame retardant being grafted onto the branched chain of the polyester molecular structure is that, when the residues from the burnt polyester film drop down on the cotton, the cotton would burn easily. However, it would be relatively difficult for the polyester film to be dissolved by water and degraded by heat.

Accordingly, in consideration of both the flame-retardant effect and the effect of being not degraded easily, it is preferable for the above-mentioned reactive flame retardant to be simultaneously grafted onto the main chain and the branched chain of the polyester molecular structure.

Moreover, the added flame retardant is a phosphorus flame retardant that would not have a grafting reaction with the raw material mixture. Compounds of the above-mentioned added flame retardant are as illustrated below, but the present disclosure is not limited thereto.

chemical reproducing step, so that the polyester film that is finally formed is provided with a certain flame-retardant effect.

In terms of content, a content of a phosphorus (P) element of the phosphorus flame retardant in the polyester film is between 10 ppm and 20,000 ppm, generally between 1,000 ppm and 20,000 ppm, preferably between 2,000 ppm and 18,000 ppm, and more preferably between 3,000 ppm and 15,000 ppm. However, the present disclosure is not limited thereto.

Based on the above-mentioned configuration, in terms of flame-retardant level, the polyester film of the present embodiment can satisfy a flame-retardant standard of UL94 VTM-2, or even a flame-retardant standard of UL94 VTM-0.

TABLE 2

Added Flame Retardant

| No. | Compound name | Chemical structural formula |
| --- | --- | --- |
| 2-1 | 9,10-dihydro-9-oxa-10-phosphaphenanthrene-10-oxide | |
| 2-2 | aluminium diethylphosphinate | |
| 2-3 | 2,5-dihydroxyphenyl(diphenyl) phosphine oxide | |
| 2-4 | poly(2-hydroxy propylene spirocyclic pentaerythritol bisphosphate) | |
| 2-5 | polysulfonyldiphenylene phenylphosphonate | |
| 2-6 | poly(2,2-dimethylpropylene spirocyclic pentaerythritol bisphosphate) | |

The added flame retardant is added to the recycled polyester material in the physical reproducing step and/or the Further, as the flame-retardant polyester film of the present embodiment has a certain flame-retardant effect, it can be applied to specific products (e.g., architectural materials, electronic products, light-shading tapes for mobile phone, and laptop keyboard skins).

It is worth mentioning that, according to product design requirements, the flame-retardant polyester film of the present embodiment may be selectively added with coloring materials or dyeing agents, so as to exhibit specific colors (e.g., black, white, or alternating black and white).

In order for the polyester film to have more additional functionalities, different functional additives, such as a slipping agent, a matte additive, and a coloring additive, can be added to a melted mixture in the process of manufacturing the film, so as to produce physically recycled slipping polyester chips, physically recycled matte polyester chips, and physically recycled colored polyester chips, respectively. It should be noted that, the main component forming each of the physically recycled slipping polyester chips, the physically recycled matte polyester chips, and the physically recycled colored polyester chips is the recycled polyethylene terephthalate.

More specifically, the slipping agent can be, for example, but is not limited to, silicon dioxide, polystyrene, poly (methyl methacrylate), silica gel, acrylic or a combination thereof. Expressed in percent by weight based on a total weight of a polyester composition, an added amount of the slipping agent is between 5% and 10% by weight. In a preferred embodiment, through an addition of the slipping agent, the polyester film has a transparency of not less than 85%.

The matte additive can be, for example, but is not limited to, silicon dioxide particles, calcium carbonate particles, aluminum oxide particles, talc powder, or a combination thereof. Expressed in percent by weight based on the total weight of the polyester composition, an added amount of the matte additive is between 0.5% and 10% by weight. In a preferred embodiment, through an addition of the matte additive, the polyester film has a haze of 5% to 95%.

The coloring additive can be an additive of any color, such as a white additive or a black additive. The white additive can be titanium dioxide, barium sulfate, calcium carbonate, or a combination thereof. The black additive can be carbon black and black coloring materials, or a combination thereof. In some embodiments, expressed in percent by weight based on the total weight of the polyester film, an added amount of the white additive is between 5% and 40% by weight, so that the polyester film is of white color and has an optical density (OD) of not less than 1.2 In some embodiments, expressed in percent by weight based on the total weight of the polyester film, an added amount of the black additive is between 5% and 40% by weight, so that the polyester film is of black color and has an optical density of not less than 1.5.

It is also worth mentioning that, the plurality of physically recycled polyester chips and the plurality of chemically recycled polyester chips as mentioned above are both obtained through recycling, reusing, and granulation of the recycled polyester material. The recycled polyester material is recycled PET (r-PET) bottle chips.

In one embodiment of the present disclosure, a polyester component of the recycled PET bottle chips includes isophthalic acid (IPA) serving as a dibasic acid unit, so that the polyester film that is finally formed also contains the isophthalic acid. Expressed in mole percent based on the total weight of the polyester film, a content of the isophthalic acid in the polyester film is between 0.5 mol % and 5 mol %.

In one embodiment of the present disclosure, a polyester component of the recycled PET bottle chips includes biomass-derived ethylene glycol serving as a diol unit, so that the polyester film that is finally formed also contains the biomass-derived ethylene glycol. Expressed in percent by weight based on the total weight of the polyester film, a content of the biomass-derived ethylene glycol in the polyester film is between 1% and 25% by weight. In addition, a content of carbon derived from the biomass as measured by carbon dating (C14) is not greater than 5% based on a total carbon content of the polyester film.

In one embodiment of the present disclosure, a polyester component of the recycled PET bottle chips includes a metal catalyst, so that the polyester film that is finally formed also contains the metal catalyst. The metal catalyst is at least one selected from a material group consisting of antimony (Sb), germanium (Ge), and titanium (Ti). Expressed in percent by weight based on the total weight of the polyester film, a content of the metal catalyst in the polyester film is between 0.0003% and 0.04% by weight.

[Beneficial Effects of the Embodiments]

One beneficial effect of the present disclosure is that, in the flame-retardant polyester film and the method for manufacturing the same as provided, by virtue of "the plurality of chemically recycled polyester chips further including chemically recycled electrostatic pinning polyester chips, the chemically recycled electrostatic pinning polyester chips containing at least one kind of electrostatic pinning additives, and the electrostatic pinning additives being metal salts" and "based on 100 parts by weight of the total content of the polyester chips, the content of the chemically recycled electrostatic pinning polyester chips of the plurality of chemically recycled polyester chips being between 5 and 35 parts by weight", the flame-retardant polyester film can be manufactured by using a highly recycled polyester material, without needing to add additional virgin polyester chips or only needing to add a small amount thereof. In this way, a usage amount of the virgin polyester chips can be decreased significantly, and environmental concerns can be addressed.

Furthermore, in the flame-retardant polyester film and the method for manufacturing the same as provided by the present disclosure, through "adding the flame-retardant additive to the recycled polyester material in at least one of the physical reproducing step and the chemical reproducing step", the flame-retardant polyester film has a certain flame-retardant effect, and can be applied to specific products (e.g., architectural materials, electronic products, light-shading tapes for mobile phone, and laptop keyboard skins).

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A flame-retardant polyester film, comprising:
   a physically recycled polyester resin formed by a plurality of physically recycled polyester chips; and
   a chemically recycled polyester resin formed by a plurality of chemically recycled polyester chips and mixed with the physically recycled polyester resin, wherein the plurality of chemically recycled polyester chips further include chemically recycled electrostatic pinning polyester chips, and wherein the chemically recycled electrostatic pinning polyester chips contain at least one kind of electrostatic pinning additives, and the electrostatic pinning additives are metal salts;

wherein, expressed in percent by weight based on a total weight of the polyester film, a content of the electrostatic pinning additives in the polyester film is between 0.005% and 0.1% by weight;

wherein the polyester film further includes a flame-retardant additive, and the flame-retardant additive is dispersed in at least one of the physically recycled polyester resin and the chemically recycled polyester resin;

wherein the flame-retardant polyester film further comprises a black additive, and the black additive is selected from the group consisting of carbon black and black coloring materials; wherein, expressed in percent by weight based on the total weight of the polyester film, an added amount of the black additive is between 5% and 40% by weight.

2. The flame-retardant polyester film according to claim 1, wherein the flame-retardant additive is a phosphorus flame retardant, a content of a phosphorus (P) element of the phosphorus flame retardant in the flame-retardant polyester film is between 10 ppm and 20,000 ppm, and the flame-retardant polyester film satisfies a flame-retardant standard of UL94 VTM-2 and above.

3. The flame-retardant polyester film according to claim 1, wherein, expressed in percent by weight based on the total weight of the polyester film, a content of the physically recycled polyester resin is between 50% and 95% by weight, a content of the chemically recycled polyester resin is between 1% and 40% by weight, and a total content of the physically recycled polyester resin and the chemically recycled polyester resin is between 55% and 100% by weight.

4. The flame-retardant polyester film according to claim 1, wherein the plurality of chemically recycled polyester chips further include chemically recycled slipping polyester chips; wherein the chemically recycled slipping polyester chips contain a slipping agent, and the slipping agent is selected from the group consisting of silicon dioxide particles, calcium carbonate particles, barium sulfate particles, polystyrene particles, silica gel particles and acrylic particles; wherein, based on 100 parts by weight of a total content of the polyester chips, a content of the chemically recycled slipping polyester chips is between 5 and 10 parts by weight relative to the total content of the polyester chips.

5. The flame-retardant polyester film according to claim 4, wherein a particle size of the slipping agent is less than 2 micrometers; wherein, expressed in percent by weight based on the total weight of the polyester film, a content of the slipping agent in the polyester film is between 0.01% and 2% by weight, so that the polyester film has a transparency of not less than 85%.

6. The flame-retardant polyester film according to claim 1, further comprising a slipping agent, wherein the slipping agent is selected from the group consisting of silicon dioxide, polystyrene, poly(methyl methacrylate), silica gel and acrylic; wherein, expressed in percent by weight based on the total weight of the polyester film, an added amount of the slipping agent is between 5% and 10% by weight.

7. The flame-retardant polyester film according to claim 1, further comprising a matte additive, wherein the matte additive is selected from the group consisting of silicon dioxide particles, calcium carbonate particles, aluminum oxide particles and talc powder; wherein, expressed in percent by weight based on the total weight of the polyester film, an added amount of the matte additive is between 0.5% and 10% by weight.

8. The flame-retardant polyester film according to claim 1, further comprising a white additive, wherein the white additive is selected from the group consisting of titanium dioxide, barium sulfate and calcium carbonate; wherein, expressed in percent by weight based on the total weight of the polyester film, an added amount of the white additive is between 5% and 40% by weight.

\* \* \* \* \*